US006548800B2

(12) United States Patent
Chen et al.

(10) Patent No.: US 6,548,800 B2
(45) Date of Patent: Apr. 15, 2003

(54) IMAGE BLUR DETECTION METHODS AND ARRANGEMENTS

(75) Inventors: Xiangrong Chen, Beijing (CN); Hong-Jiang Zhang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 176 days.

(21) Appl. No.: 09/833,525

(22) Filed: Apr. 9, 2001

(65) Prior Publication Data

US 2002/0145106 A1 Oct. 10, 2002

(51) Int. Cl.[7] ................................. G06K 9/40
(52) U.S. Cl. ..................... 250/208.1; 382/254
(58) Field of Search ................ 250/208.1; 382/254, 382/266

(56) References Cited

U.S. PATENT DOCUMENTS 6,005,983 A  *  12/1999  Anderson et al. ........... 382/254
6,233,060 B1 *  5/2001   Shu et al. .................... 358/1.9

OTHER PUBLICATIONS

Pratt, w., Digital Image Processing, John Wiley & Sons, 1978, pp. 497–498.*

* cited by examiner

*Primary Examiner*—Georgia Epps
*Assistant Examiner*—Richard Hanig
(74) *Attorney, Agent, or Firm*—Lee & Hayes, PLLC

(57) ABSTRACT

An apparatus is provided for detecting blur in an image. The apparatus includes an image generator that is configured to generate a plurality of corresponding different resolution images based on a base image. The plurality of corresponding different resolution images is provided to an edge detector. The edge detector detects edge transitions in each of the plurality of corresponding different resolution images and provides edge maps to an edge parameter comparator. The edge parameter comparator compares corresponding edge parameters as detected by the edge detector and provides a result map to a blur calculator. The blur calculator determines at least one blur parameter based on the result map and provides the blur parameter to a blur detector. The blur detector then determines if the base image is blurred based on a comparison of the blur parameter with at least one blur parameter threshold.

34 Claims, 4 Drawing Sheets

IMAGE BLUR DETECTION METHODS AND ARRANGEMENTS

TECHNICAL FIELD

The present invention relates generally to computer imaging, and more particularly to improved image blur detection methods and arrangements based on edge detection and follow-on comparison calculations.

BACKGROUND

With the increasing popularity of personal computers, handheld appliances and the like, there has been a corresponding increase in the popularity and affordability of image rendering/manipulation applications.

Thus, for example, many personal computers and workstations are being configured as multimedia devices that are capable of receiving image data, for example, directly from a digital camera or indirectly from another networked device. These so-called multimedia devices are further configured to display the image data (e.g., still images, video, etc.). As for still images and single video frames, most multimedia devices can be further coupled to a printing device that is configured to provide a printed hardcopy of the image data.

When provided with the appropriate software application(s), the multimedia device can be configured to allow the user to manipulate all or portions of the image data in some manner. For example, there is a variety of photo/drawing manipulation applications and video editing applications available today. One example of a photo/drawing manipulation program is PhotoDraw® 2000, available from the Microsoft Corporation of Redmond, Wash. Another example of an image manipulation program is Picture It! 2000, also available from the Microsoft Corporation. One example of a video editing application is Adobe Premiere 6.0 available from Adobe Systems Incorporated of San Jose, Calif.

These and other image manipulation programs provide a multitude of image editing tools/features. In some instances, for example, in the key-frame evaluation and photo quality estimation features of Picture It! 2000, the image manipulation program may need to calculate certain characteristics associated with the image data in terms of its' blurriness/sharpness. Doing so allows for the user and/or the application to selectively or automatically manipulate blurred image data in some desired fashion. For example, a blurred portion of the image may be sharpened or perhaps protected from additional blurring.

With this in mind, previous methods for calculating blur characteristics have been designed for image restoration. By way of example, see the article by M. C. Chiang and T. E. Boult, titled "Local Blur Estimation and Super-Resolution", as published in Proc. IEEE Computer Society Conference on Computer Vision and Pattern Recognition, pp. 821–826, June 1997. Also, for example, see the article by R. L. Lagendijk, A. M. Tekalp and J. Biemond, titled "Maximum Likelihood Image and Blur Identification: A Unifying Approach" as published in Optical Engineering, 29(5):422–435, May 1990.

These exemplary conventional techniques utilize methods that estimate the parameters needed by the reverse process of blur. Unfortunately, these methods tend to be complex and time-consuming.

Still other techniques utilize compressed domain methods based on discrete cosign transform (DCT) coefficient statistics, which can be used to estimate the blurriness of motion picture expert group (MPEG) frame in real-time. For example, see the methods presented by Xavier Marichal, Wei-Ying Ma and HongJiang Zhang at the International Conference on Image Processing (ICIP) in Kobe, Japan on Oct. 25–29, 1999, as published in an article titled "Blur Determination in the Compressed Domain Using DCT Information". Unfortunately, these methods often find it difficult to handle images with relatively large uni-color patches.

Hence, there is an on-going need for new and improved methods for calculating or otherwise determining blurriness/sharpness characteristics in an image.

SUMMARY

The present invention provides new and improved methods and arrangements for calculating blurriness/sharpness characteristics in an image. In accordance with certain aspects of the present invention, the methods and arrangements can be provided in a variety of devices or appliances and used to support image rendering/presentation processes, image manipulation processes, and/or other like image data related processes. In accordance with certain exemplary implementations of the present invention, the improved methods and arrangements employ a multi-scale edge amplitude comparison to evaluate the quality of an image, rather than estimating blurriness characteristics as in the conventional methods described above. Furthermore, in certain implementations, the multi-scale edge amplitude comparison is automatically adaptable to the image content.

Thus, for example, in accordance with certain exemplary implementations of the present invention, the above stated needs and others are met by a method that includes detecting edges in a plurality of corresponding different resolution images, and for each detected edge, comparing corresponding edge parameters associated with the detected edges in the plurality of corresponding different resolution images and determining if the detected edge is blurred. In certain implementations the edge parameters associated with the detected edges include edge amplitudes.

The method may also include generating the plurality of corresponding different resolution images from a base image, such that the resulting plurality of corresponding different resolution images includes the base image and at least one corresponding lower resolution image. In certain implementations, for example, the plurality of corresponding different resolution images includes the base image a second corresponding lower resolution image, and a third corresponding lower resolution image that is also lower in resolution than the second corresponding lower resolution image.

In detecting the edges in the plurality of corresponding different resolution images, the method may further include generating a corresponding plurality of detected edge maps. In such a case, the step of comparing the corresponding edge parameters associated with the detected edges may also include comparing corresponding edge amplitudes as provided in the plurality of detected edge maps to generate a result map.

The method may include the additional step of calculating a blur parameter based on this result map. For example, the blur parameter might include a blur percentage.

In still other implementations, the method may also include the step of determining if the base image is blurred based on a comparison of the blur parameter with at least one blur parameter threshold.

In accordance with certain further implementations of the present invention, an apparatus is provided. The apparatus includes an edge detector that is configured to detect edge transitions in a plurality of corresponding different resolution images, an edge parameter comparator that is configured to compare corresponding edge parameters as detected by the edge detector, and a blur calculator that is configured to determine at least one blur parameter based on comparison results as determined by the edge parameter comparator. The apparatus may also include an image generator that is configured to generate the plurality of corresponding different resolution images based on a base image, and provide the plurality of corresponding different resolution images to the edge detector. In still further implementations, the apparatus may include a blur detector that is configured to determine if a base image is blurred based on a comparison of the at least one blur parameter with at least one blur parameter threshold.

BRIEF DESCRIPTION OF THE DRAWINGS

A more complete understanding of the various methods and arrangements of the present invention may be had by reference to the following detailed description when taken in conjunction with the accompanying drawings wherein.

DETAILED DESCRIPTION

Figure 1:
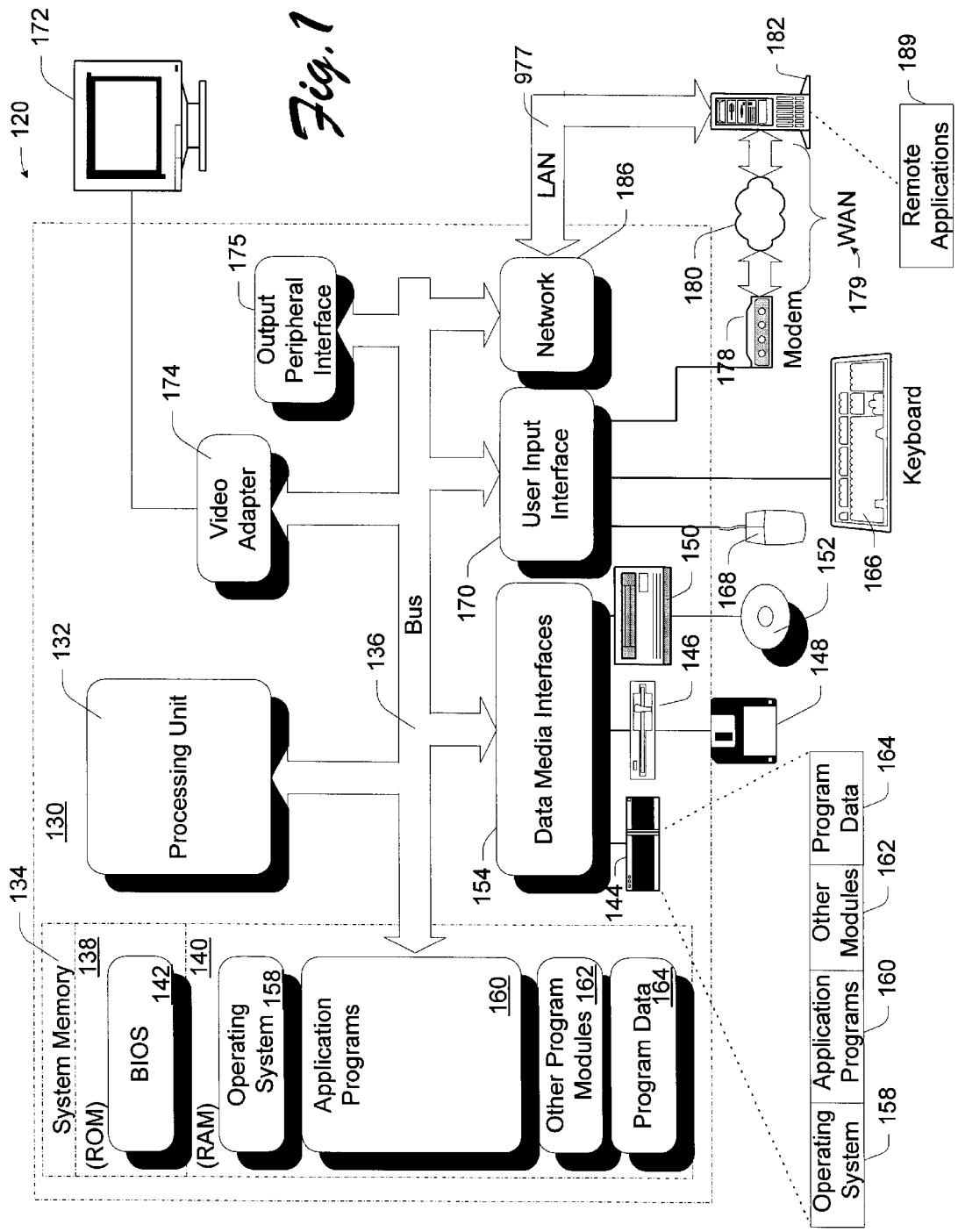
FIG. 1 is a block diagram that depicts an exemplary device, in the form of a computer, which is suitable for use with certain implementations of the present invention.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

FIG. 1 illustrates an example of a suitable computing environment 120 on which the subsequently described methods and arrangements may be implemented.

Exemplary computing environment 120 is only one example of a suitable computing environment and is not intended to suggest any limitation as to the scope of use or functionality of the improved methods and arrangements described herein. Neither should computing environment 120 be interpreted as having any dependency or requirement relating to any one or combination of components illustrated in computing environment 120.

The improved methods and arrangements herein are operational with numerous other general purpose or special purpose computing system environments or configurations. Examples of well known computing systems, environments, and/or configurations that may be suitable include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, distributed computing environments that include any of the above systems or devices, and the like.

As shown in FIG. 1, computing environment 120 includes a general-purpose computing device in the form of a computer 130. The components of computer 130 may include one or more processors or processing units 132, a system memory 134, and a bus 136 that couples various system components including system memory 134 to processor 132.

Bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus also known as Mezzanine bus.

Computer 130 typically includes a variety of computer readable media. Such media may be any available media that is accessible by computer 130, and it includes both volatile and non-volatile media, removable and non-removable media.

In FIG. 1, system memory 134 includes computer readable media in the form of volatile memory, such as random access memory (RAM) 140, and/or non-volatile memory, such as read only memory (ROM) 138. A basic input/output system (BIOS) 142, containing the basic routines that help to transfer information between elements within computer 130, such as during start-up, is stored in ROM 138. RAM 140 typically contains data and/or program modules that are immediately accessible to and/or presently being operated on by processor 132.

Computer 130 may further include other removable/non-removable, volatile/non-volatile computer storage media. For example, FIG. 1 illustrates a hard disk drive 144 for reading from and writing to a non-removable, non-volatile magnetic media (not shown and typically called a "hard drive"), a magnetic disk drive 146 for reading from and writing to a removable, non-volatile magnetic disk 148 (e.g., a "floppy disk"), and an optical disk drive 150 for reading from or writing to a removable, non-volatile optical disk 152 such as a CD-ROM, CD-R, CD-RW, DVD-ROM, DVD-RAM or other optical media. Hard disk drive 144, magnetic disk drive 146 and optical disk drive 150 are each connected to bus 136 by one or more interfaces 154.

The drives and associated computer-readable media provide nonvolatile storage of computer readable instructions, data structures, program modules, and other data for computer 130. Although the exemplary environment described herein employs a hard disk, a removable magnetic disk 148 and a removable optical disk 152, it should be appreciated by those skilled in the art that other types of computer readable media which can store data that is accessible by a computer, such as magnetic cassettes, flash memory cards, digital video disks, random access memories (RAMs), read only memories (ROM), and the like, may also be used in the exemplary operating environment.

A number of program modules may be stored on the hard disk, magnetic disk 148, optical disk 152, ROM 138, or RAM 140, including, e.g., an operating system 158, one or more application programs 160, other program modules 162, and program data 164.

The improved methods and arrangements described herein may be implemented within operating system 158, one or more application programs 160, other program modules 162, and/or program data 164.

A user may provide commands and information into computer 130 through input devices such as keyboard 166 and pointing device 168 (such as a "mouse"). Other input devices (not shown) may include a microphone, joystick, game pad, satellite dish, serial port, scanner, camera, etc. These and other input devices are connected to the processing unit 132 through a user input interface 170 that is coupled to bus 136, but may be connected by other interface and bus structures, such as a parallel port, game port, or a universal serial bus (USB).

A monitor 172 or other type of display device is also connected to bus 136 via an interface, such as a video adapter 174. In addition to monitor 172, personal computers typically include other peripheral output devices (not shown), such as speakers and printers, which may be connected through output peripheral interface 175.

Computer 130 may operate in a networked environment using logical connections to one or more remote computers, such as a remote computer 182. Remote computer 182 may include many or all of the elements and features described herein relative to computer 130.

Logical connections shown in FIG. 1 are a local area network (LAN) 177 and a general wide area network (WAN) 179. Such networking environments are commnonplace in offices, enterprise-wide computer networks, intranets, and the Internet.

When used in a LAN networking environment, computer 130 is connected to LAN 177 via network interface or adapter 186. When used in a WAN networking environment, the computer typically includes a modem 178 or other means for establishing communications over WAN 179. Modem 178, which may be internal or external, may be connected to system bus 136 via the user input interface 170 or other appropriate mechanism.

Depicted in FIG. 1, is a specific implementation of a WAN via the Internet. Here, computer 130 employs modem 178 to establish communications with at least one remote computer 182 via the Internet 180.

In a networked environment, program modules depicted relative to computer 130, or portions thereof, may be stored in a remote memory storage device. Thus, e.g., as depicted in FIG. 1, remote application programs 189 may reside on a memory device of remote computer 182. It will be appreciated that the network connections shown and described are exemplary and other means of establishing a communications link between the computers may be used.

This description will now focus on certain aspects of the present invention associated with image processing/handling.

Human vision often relies upon visible edge transitional information to evaluate the quality of an image. For example, when looking at an image of a completely white painted smooth wall it would be difficult, if not impossible, for a person to determine if the image or a portion thereof is blurred. However, if a black line has been drawn across the surface of the wall, a person would be more likely to determine if the image or at least the portion containing the black line is blurred. For example, if the entire image is blurred, than the black line will appear fuzzy, wider, and/or perhaps gray, etc., as would be expected for a blurred line/image.

Recognizing this human ability to detect the blurriness/sharpness of a line or color/pattern based on the edges, the exemplary methods and arrangements described herein provide a similar technique for devices.

Figure 2:
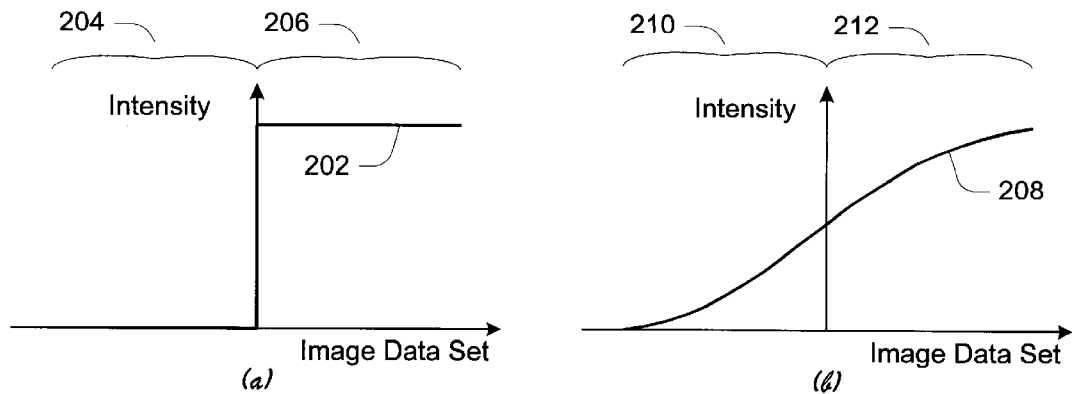
FIGS. 2a–b are line graphs depicting a step edge and a smoothed step edge, respectively, within exemplary images.

With this in mind, attention is drawn to FIGS. 2a–b, which are line graphs depicting a step edge and a smoothed step edge, respectively, within exemplary images. These line graphs depict the changing amplitudes of the image data at a certain points (e.g., pixels). The step edge, as represented by line 202 in FIG. 2a, illustrates that the amplitude of the image data changes abruptly between a first portion of the image (region 204) and a second portion of the image (region 206). This so-called step edge would tend to indicate that the image at regions 204 and 206 is more than likely not blurred, but instead is significantly sharp.

To the contrary, the smoothed step edge, as represented by line 208 in FIG. 2b, illustrates that the amplitude of the image data changes gradually between a first portion of the image (region 210) and a second portion of the image (region 212). This so-called smoothed step edge would tend to indicate that the image at regions 210 and 212 is more than likely blurred, since it is not as sharp a change as the step edge in FIG. 2a.

Figure 3:
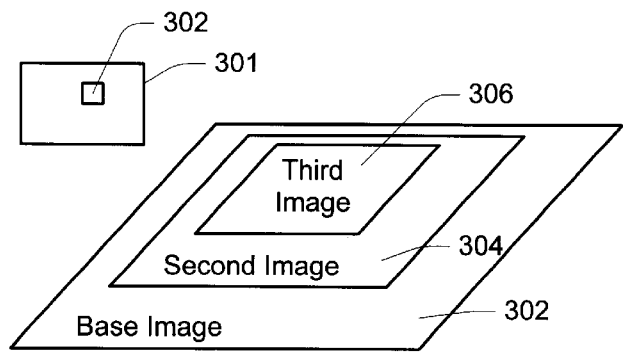
FIG. 3 is an illustrative representation of a multi-scale image pyramid having a plurality of different resolutions of the same image, in accordance with certain aspects of the present invention.

Reference is now made to FIG. 3, which is an illustrative representation of a multi-scale image pyramid 300 having a plurality of different resolutions of the same image, in accordance with certain aspects of the present invention.

Multi-scale image pyramid 300, as will be described in greater detail below, provides a basis for determining if a detected edge within an image is sufficiently blurred enough to be considered blurred or if the detected edge is sufficiently sharp enough to be considered sharp (or not blurred).

In this example, multi-scale image pyramid 300, includes a base image 302 (which may be part of a larger original image 301, for example) having a resolution of 100×100 pixels, a corresponding second image 304 having a reduced resolution of 75×75 pixels, and a corresponding third image 306 having an even more reduced resolution of 50×50 pixels. Here, second image 304 and third image 306 have each been generated from base image 302 using conventional resolution reduction techniques.

While exemplary multi-scale image pyramid 300 includes three levels of resolution, those skilled in the art will recognize that the methods and arrangements described herein may be implemented with a greater or lesser number of multi-scaled images, as required.

Figure 4:
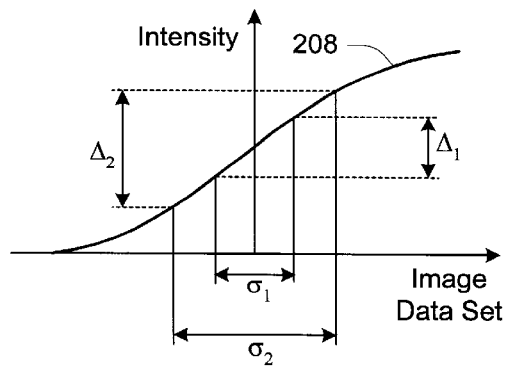
FIG. 4 is a line diagram depicting exemplary corresponding multi-scale edge amplitudes, in accordance with certain aspects of the present invention.

With this in mind, based on multi-scale image pyramid 300, FIG. 4 illustrates the amplitude of a smoothed step edge associated with two different corresponding image resolutions, in accordance with certain aspects of the present invention.

Here, a differential operator is applied on the smoothed step edge. As shown, the edge amplitude Δ will change according to the size σ of the differential operator. Let $\sigma_1$ and $\Delta_1$ be associated with a lower resolution image in multi-scale image pyramid 300, and $\sigma_2$ and $\Delta_2$ be associated with a higher resolution image in multi-scale image pyramid 300. As shown, if $\sigma_1 > \sigma_2$, then $\Delta_1 > \Delta_2$. This property would not exist for a sharp edge. Thus, a multi-scale edge amplitude comparison can be used to detect the blurriness/sharpness of images or portions thereof.

In accordance with certain aspects of the present invention, as described in the exemplary methods and arrangements below, multi-scaled images are used instead of multi-scale differential operators to reduce the computation complexity.

Figure 5:
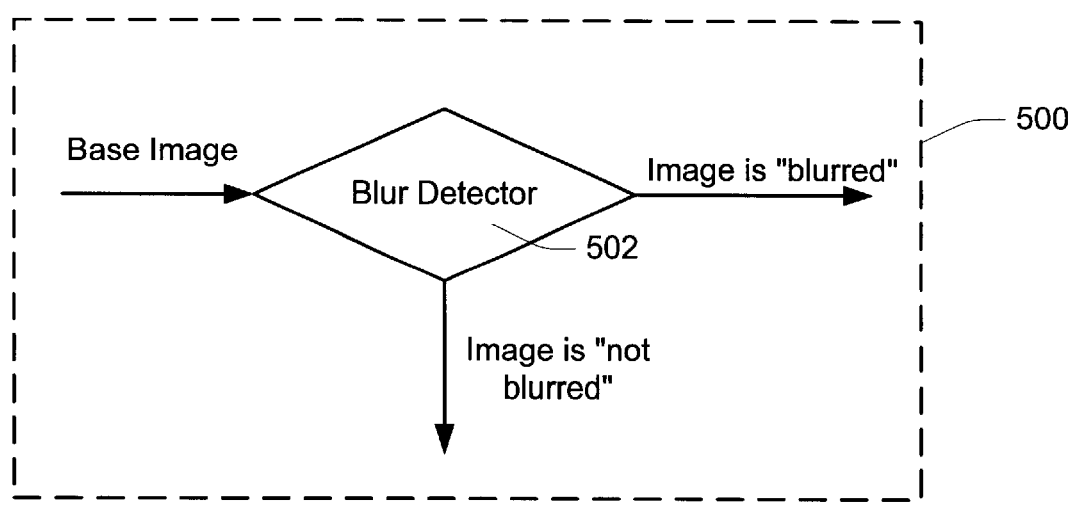
FIG. 5 is a block diagram associated with an exemplary blur detector system architecture, in accordance with certain implementations of the present invention.

FIG. 5 presents a block diagram associated with an exemplary blur detector system architecture, in accordance with certain implementations of the present invention.

Here, an image handling mechanism 500 (e.g., an image rendering and/or manipulation application, or like device/arrangement) includes a blur detector 502 that is configured to receive or otherwise access base image 302 (which may be all or part of an original image) and to determine if base image 302 is "blurred" or "not blurred" according to certain selectively defined parameters.

Figure 6:
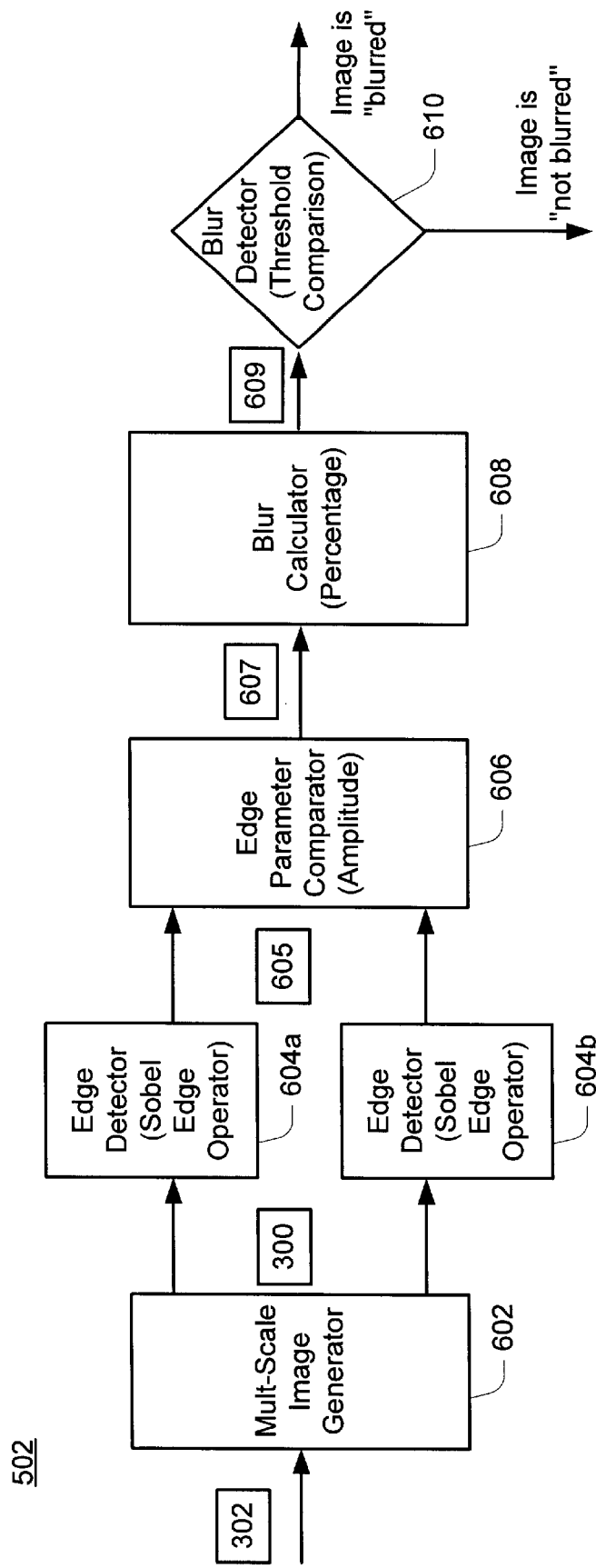
FIG. 6 is a block diagram associated with an exemplary blur detector algorithm for use in the blur detector system architecture of FIG. 5, for example, in accordance with certain further implementations of the present invention.

FIG. 6 is a block diagram associated with an exemplary blur detector algorithm for use in blur detector 502 of FIG. 5, for example, in accordance with certain further implementations of the present invention.

As depicted, blur detector 502 includes a series of functional blocks that process base image 302 and determine if it is "blurred" or "not blurred". First, base image 302 is provided to a multi-scale image generator 602, which is configured to generate the images in multi-scale image pyramid 300 (FIG. 3). Next, the resulting multi-scale images are provided to one or more edge operators or detectors, in this example, Sobel edge operators 604a–b. The edge operators calculate an edge amplitude on each of the pixels of an image. Pixels having an edge amplitude greater than a preset threshold are called "edge pixels". The edge operators produce corresponding multi-scale edge maps 605, which are then provided to a multi-scale edge amplitude comparator 606. A resulting edge amplitude comparison map 607 is then provided to a blur percentage calculator 608, which produces at least one blurriness measurement, in this example, a blur percentage 609, which is then provided to threshold detector 610. Threshold detector 610 determines if the blurriness measurement(s) is within or without at least one threshold range. For example, blur percentage 609 can be compared to a defined, selectively set threshold blur percentage.

In this manner a comparison of edge amplitudes for various resolutions of base image 302 is made. For a given detected edge pixel of third image 306, if the edge amplitude is greater than the corresponding edge amplitude of second image 304, and if the edge amplitude of second image 304 is greater than the corresponding edge amplitude of base image 302, then the detected edge pixel is mapped in result map 607 as "blurred". This process is completed for all detected edge pixels of third image 306. Blur percentage 609 of base image 302 can then be calculated by comparing the number of pixels that are "blurred" in result map 607 with the total number of edge pixels of third image 306. Thus, for example, in FIG. 3 if there are 1,000 edge pixels in third image 306, assuming 700 of them have been mapped as "blurred", then blur percentage 609 would equal 70%. If the threshold percentage is set to 65%, then threshold detector 610 would consider base image 302 as being "blurred". Conversely, if the threshold percentage is set to 75%, then threshold detector 610 would consider base image 302 as being "not blurred".

Moreover, by selectively controlling the size of base image 302, one can further determine if a portion of a larger image, as represented by base image 302, is blurred or not blurred. This may also be determined from result map 607. Hence, it may be useful to provide additional details as to which regions may or may not be determined to be blurred. Further implementations may allow for additional threshold values, or ranges, that provide additional feedback to the user and/or image handling mechanism 500.

Those skilled in the art will recognize that the above-described exemplary methods and arrangements are adaptable for use with a variety of color and monochrome image data, including, for example, RGB data, YUV data, CMYK data, etc.

Although some preferred embodiments of the various methods and arrangements of the present invention have been illustrated in the accompanying Drawings and described in the foregoing Detailed Description, it will be understood that the invention is not limited to the exemplary embodiments disclosed, but is capable of numerous rearrangements, modifications and substitutions without departing from the spirit of the invention as set forth and defined by the following claims.

What is claimed is:

1. A method comprising:
    detecting edges in a plurality of corresponding different resolution images; and
    for each detected edge, comparing corresponding edge parameters associated with the detected edges in the plurality of corresponding different resolution images and determining if the detected edge is blurred.

2. The method as recited in claim 1, wherein the corresponding edge parameters associated with the detected edges in the plurality of corresponding different resolution images includes corresponding edge amplitudes associated with the detected edges in the plurality of corresponding different resolution images.

3. The method as recited in claim 1, further comprising generating the plurality of corresponding different resolution images from a base image.

4. The method as recited in claim 3, wherein the plurality of corresponding different resolution images includes the base image and at least one corresponding lower resolution image.

5. The method as recited in claim 3, wherein the plurality of corresponding different resolution images includes the base image a second corresponding lower resolution image, and a third corresponding lower resolution image that is also lower in resolution than the second corresponding lower resolution image.

6. The method as recited in claim 3, wherein the base image is a portion of a larger original image.

7. The method as recited in claim 1, wherein detecting the edges in the plurality of corresponding different resolution images further includes generating a corresponding plurality of detected edge maps.

8. The method as recited in claim 7, wherein comparing the corresponding edge parameters associated with the detected edges in the plurality of corresponding different resolution images further includes comparing corresponding edge amplitudes as provided in the plurality of detected edge maps to generate a result map.

9. The method as recited in claim 8, further comprising calculating a blur parameter based on the result map.

10. The method as recited in claim 9, wherein the blur parameter includes a blur percentage parameter.

11. The method as recited in claim 9, further comprising generating the plurality of corresponding different resolution images from a base image and determining if the base image is blurred based on a comparison of the blur parameter with at least one blur parameter threshold.

12. A computer-readable medium having computer-implementable instructions for performing acts comprising:
   locating edges in a plurality of corresponding different resolution samples of an image; and
   for each located edge, comparing corresponding edge parameters associated with the located edges in the plurality of corresponding different resolution samples to determine if the located edge is significantly blurred.

13. The computer-readable medium as recited in claim 12, wherein the corresponding edge parameters associated with the located edges in the plurality of corresponding different resolution samples include amplitudes associated with located edges.

14. The computer-readable medium as recited in claim 12, having further computer-implementable instructions for performing acts comprising:
   providing a base image file having image data associated with the image; and
   processing the base image to produce one or more corresponding different resolution samples of the image.

15. The computer-readable medium as recited in claim 14, wherein the plurality of corresponding different resolution samples includes the base image and at least one corresponding lower resolution sample.

16. The computer-readable medium as recited in claim 14, wherein the plurality of corresponding different resolution samples includes the base image, a second corresponding lower resolution sample, and a third corresponding lower resolution sample that is also lower in resolution than the second corresponding lower resolution sample.

17. The computer-readable medium as recited in claim 14, wherein the base image is a portion of a larger original image.

18. The computer-readable medium as recited in claim 12, wherein locating the edges in the plurality of corresponding different resolution samples further includes generating a corresponding plurality of detected edge maps.

19. The computer-readable medium as recited in claim 18, wherein comparing the corresponding edge parameters associated with the located edges in the plurality of corresponding different resolution samples further includes comparing amplitudes as provided in the plurality of detected edge maps to generate a result map.

20. The computer-readable medium as recited in claim 19, having further computer-implementable instructions for performing acts comprising calculating at least one blur parameter based on the result map.

21. The computer-readable medium as recited in claim 20, wherein the blur parameter includes a blur percentage.

22. The computer-readable medium as recited in claim 20, having further computer-implementable instructions for performing acts comprising:
   creating the plurality of corresponding different resolution samples from a base image; and
   determining if selected portions of the base image are blurred based on a comparison of the blur parameter with at least one threshold value.

23. An apparatus comprising:
   an edge detector configured to detect edge transitions in a plurality of corresponding different resolution images;
   an edge parameter comparator configured to compare corresponding edge parameters as detected by the edge detector; and
   a blur calculator configured to determine at least one blur parameter based on comparison results as determined by the edge parameter comparator.

24. The apparatus as recited in claim 23, wherein the corresponding edge parameters include corresponding edge amplitudes associated with the detected edge transitions.

25. The apparatus as recited in claim 23, further comprising an image generator configured to generate the plurality of corresponding different resolution images based on an base image, and provide the plurality of corresponding different resolution images to the edge detector.

26. The apparatus as recited in claim 25, wherein the plurality of corresponding different resolution images includes the base image and at least one corresponding lower resolution image.

27. The apparatus as recited in claim 25, wherein the plurality of corresponding different resolution images includes the base image a second corresponding lower resolution image, and a third corresponding lower resolution image that is also lower in resolution than the second corresponding lower resolution image.

28. The apparatus as recited in claim 25, wherein the base image is a portion of a larger original image.

29. The apparatus as recited in claim 23, wherein the edge detector is further configured to generate a corresponding plurality of detected edge maps.

30. The apparatus as recited in claim 29, wherein the edge parameter comparator is further configured to compare corresponding edge amplitudes as provided in the plurality of detected edge maps to generate a result map.

31. The apparatus as recited in claim 30, wherein the blur calculator is further configured to calculate the at least one blur parameter based on the result map.

32. The apparatus as recited in claim 31, wherein the at least one blur parameter includes a blur percentage parameter.

33. The apparatus as recited in claim 25, further comprising a blur detector configured to determine if the base image is blurred based on a comparison of the at least one blur parameter with at least one blur parameter threshold.

34. The apparatus as recited in claim 23, wherein the apparatus is configured within logic and memory of a computer.

* * * * *

UNITED STATES PATENT AND TRADEMARK OFFICE
CERTIFICATE OF CORRECTION

PATENT NO.     : 6,548,800 B2
DATED          : April 15, 2003
INVENTOR(S)    : Chen et al.

It is certified that error appears in the above-identified patent and that said Letters Patent is hereby corrected as shown below:

Column 5,
Line 45, replace "commnonplace" with -- commonplace --.

Signed and Sealed this

Seventeenth Day of June, 2003

JAMES E. ROGAN
*Director of the United States Patent and Trademark Office*